(12) United States Patent
Merry

(10) Patent No.: US 10,685,578 B2
(45) Date of Patent: Jun. 16, 2020

(54) TEST SCANNING AND EVALUATION SYSTEM

(71) Applicant: Mark Stephen Merry, Holly Springs, NC (US)

(72) Inventor: Mark Stephen Merry, Holly Springs, NC (US)

(*) Notice: Subject to any disclaimer, the term of this patent is extended or adjusted under 35 U.S.C. 154(b) by 0 days.

(21) Appl. No.: 16/393,452

(22) Filed: Apr. 24, 2019

(65) Prior Publication Data

US 2019/0251856 A1 Aug. 15, 2019

Related U.S. Application Data

(63) Continuation-in-part of application No. 15/281,759, filed on Sep. 30, 2016, now Pat. No. 10,504,377.

(51) Int. Cl.
| | |
|---|---|
| *G09B 7/00* | (2006.01) |
| *G09B 7/06* | (2006.01) |
| *G09B 3/02* | (2006.01) |
| *G09B 7/02* | (2006.01) |

(52) U.S. Cl.
CPC .............. *G09B 7/06* (2013.01); *G09B 3/02* (2013.01); *G09B 7/02* (2013.01)

(58) Field of Classification Search
USPC ....... 434/322, 325, 327, 331, 335, 337, 341, 434/344, 353, 354, 355, 358
See application file for complete search history.

(56) References Cited

U.S. PATENT DOCUMENTS

| | | | | | |
|---|---|---|---|---|---|
| 3,574,263 | A | * | 4/1971 | Del Elia | G06K 17/0032 434/355 |
| 3,722,111 | A | * | 3/1973 | Georges | G06K 17/0032 434/355 |
| 3,983,364 | A | * | 9/1976 | Firehammer | G06K 7/14 434/358 |
| 4,074,445 | A | * | 2/1978 | Friedman | G09B 3/08 434/354 |
| 4,217,487 | A | * | 8/1980 | Kjeer | G06K 7/10851 235/455 |
| 4,303,399 | A | * | 12/1981 | Scott | G09B 7/066 434/358 |
| 5,362,950 | A | * | 11/1994 | Larocque | G06K 17/0032 235/448 |
| 5,597,311 | A | * | 1/1997 | Yanagida | G09B 3/04 382/317 |
| 7,911,660 | B2 | * | 3/2011 | Poor | G06K 7/12 235/475 |
| 2006/0134594 | A1 | * | 6/2006 | Yokota | G06Q 10/10 434/353 |
| 2006/0160054 | A1 | * | 7/2006 | Onishi | G09B 7/02 434/322 |
| 2010/0015591 | A1 | * | 1/2010 | Dai | G06K 17/0032 434/358 |
| 2015/0187219 | A1 | * | 7/2015 | Sheppard | G06T 3/00 434/354 |

* cited by examiner

*Primary Examiner* — Kurt Fernstrom
(74) *Attorney, Agent, or Firm* — MU P.C.

(57) ABSTRACT

An answer evaluation system has an answer tablet, having a plurality of holes forming a grid, wherein a colored translucent bead is insertable into hole. The answer tablet is received by an enclosure. The enclosure is adapted to direct light from a light sourced positioned below the answer tablet to the camera of a device. Further, the answer evaluation system processes images of the answer tablet to evaluate and score a corresponding test.

11 Claims, 5 Drawing Sheets

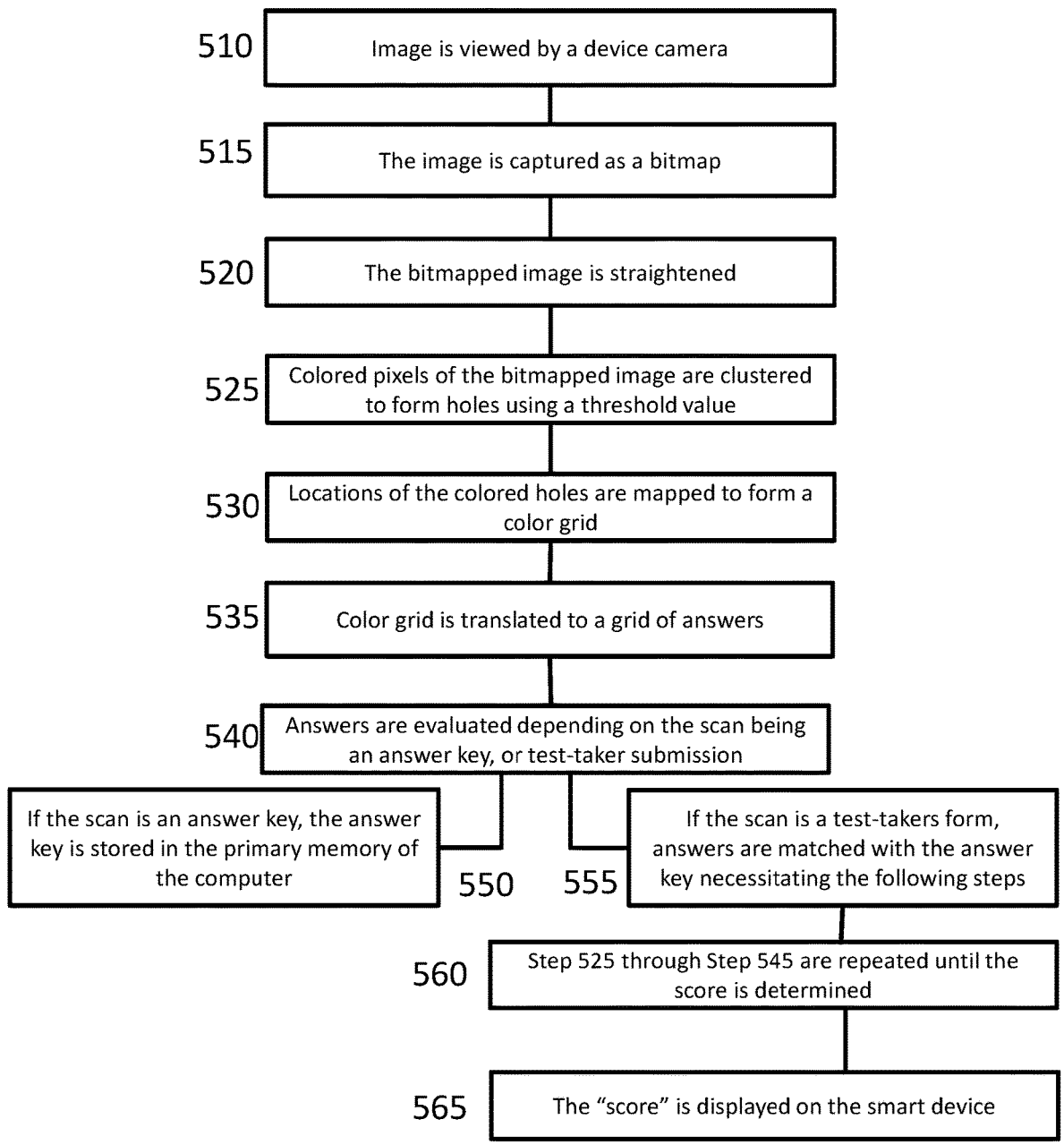

TEST SCANNING AND EVALUATION SYSTEM

CROSS-REFERENCE TO RELATED APPLICATION(S)

The present application is a continuation-in-part of U.S. Non-provisional patent application Ser. No. 15/281,759 filed on Sep. 30, 2016, entitled "TEST SCANNING AND EVALUATION SYSTEM" the entire disclosure of which is incorporated by reference herein.

BACKGROUND OF THE INVENTION

1. Field of Invention

The present invention relates to the field of test answer forms and more specifically to the field of an answer form scanning system and software therein.

2. Description of Related Art

Testing is a ubiquitous part of modern society. The technology has changed drastically in recent years. Long gone are the days of writing test answers in writing with a pen or pencil. The technology requires far too much paper, writing utensil, and employee resources to be favorable.

Tests requiring longhand writing typically require many pieces of paper. As is known, the paper must come from somewhere, and in many cases its production requires huge amounts of natural resources and deforestation. On top of this, transportation of the heavy material is an environmental pollutant, forming a two-fold hit on the environment.

To combat this problem, machine-readable test documents were developed and utilized when a multiple-choice format for the test was used. These documents are placed through an imaging scanner in order to analyze which answers are selected. With this technology, a specific pencil is required to fill in boxes that coordinate with both test questions and answer options of those questions. If they testing center does not provide the correct pencil, the tester may be forced to miss the test. Furthermore, if the tester misplaces pencil lead in answer boxes in which the lead does not belong, the image scanner may record an unintended answer.

The correct pencil was needed in the past as the image scanner created a binary image. This method produced problems and more sophisticated image scanners took their place.

While the time saved makes the device convenient for the proctor, these systems can be expensive, pricing-out some markets. Image scanners used by popular system view the answer form in a similar fashion as the human eye. The technology is the main money generator for companies producing the prior art. This business model is expensive and environmentally unfriendly as each testing center or classroom must have its own image scanner.

Recent advancements in technology have led many test proctors to switch to a computer format. While this satisfies environmental concerns, relying solely on software to issue, score, and relay results of a test can have its own inherent problems. Many of these pertain to the testing system not responding properly and the test-taker missing the time frame given for the test. Furthermore, if the test is to be taken in one sitting and the system crashes, the test-taker may be given an automatic no-pass. Currently, biometric identification of the test-taker is not practical.

Further, test-evaluating systems have been developed which utilize existing nonspecific hardware in order to evaluate answers. Current technology ranges from utilizing a standard document scanner, such as those connected to a personal computer, to scan a paper test form. Some systems allow the user to create their own test form, however, these application demand single use paper. It is a goal of the invention herein to reduce the environmental impact of exams. Embodiments are available that either use the internet to evaluate, store, and analyze information, as well as embodiments which require their own software application.

Some more recent inventions also rely on a smart device camera to scan an image of the tests, followed by utilizing evaluation software to analyze an answer form. There are multiple pitfalls with these platforms. First, scanning an answer form relies on the accuracy of a smart phone camera, the camera analyzes light and dark pixels on the answer form and guesses as to which bubbles are filled in. Results may be skewed by ambient lighting in the room, leaving increasing margins of error in the results. Further, these embodiments still rely on single-use paper products to be used as the answer form.

Based on the foregoing, there is a need in the art for an environmentally friendly, cost efficient, mobile enabled, and discrete grading system that provides a fast and accurate method of grading while retaining ease of use. Furthermore, improvements are needed to use pre-existing technology, such as a smart device, in order to reduce manufacturing and environmental impacts.

SUMMARY OF THE INVENTION

In an embodiment, an answer evaluation system includes an answer tablet having a plurality of answer holes oriented to form an answer grid. Translucent colored beads are inserted into the holes of the answer grid to represent an answer choice for a corresponding test.

In an embodiment, the answer evaluation system further includes a light enclosure with a hollow interior. The enclosure provides a tablet dock to receive an answer tablet. The enclosure also includes a light dock to receive a light source and position the light source below the tablet dock. The enclosure is provided with a lid having an aperture such that images of the answer tablet may be captured by a camera.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 5 is a flowchart regarding a method of use, according to an embodiment of the present invention.

DETAILED DESCRIPTION OF PREFERRED EMBODIMENTS

Figure 1:
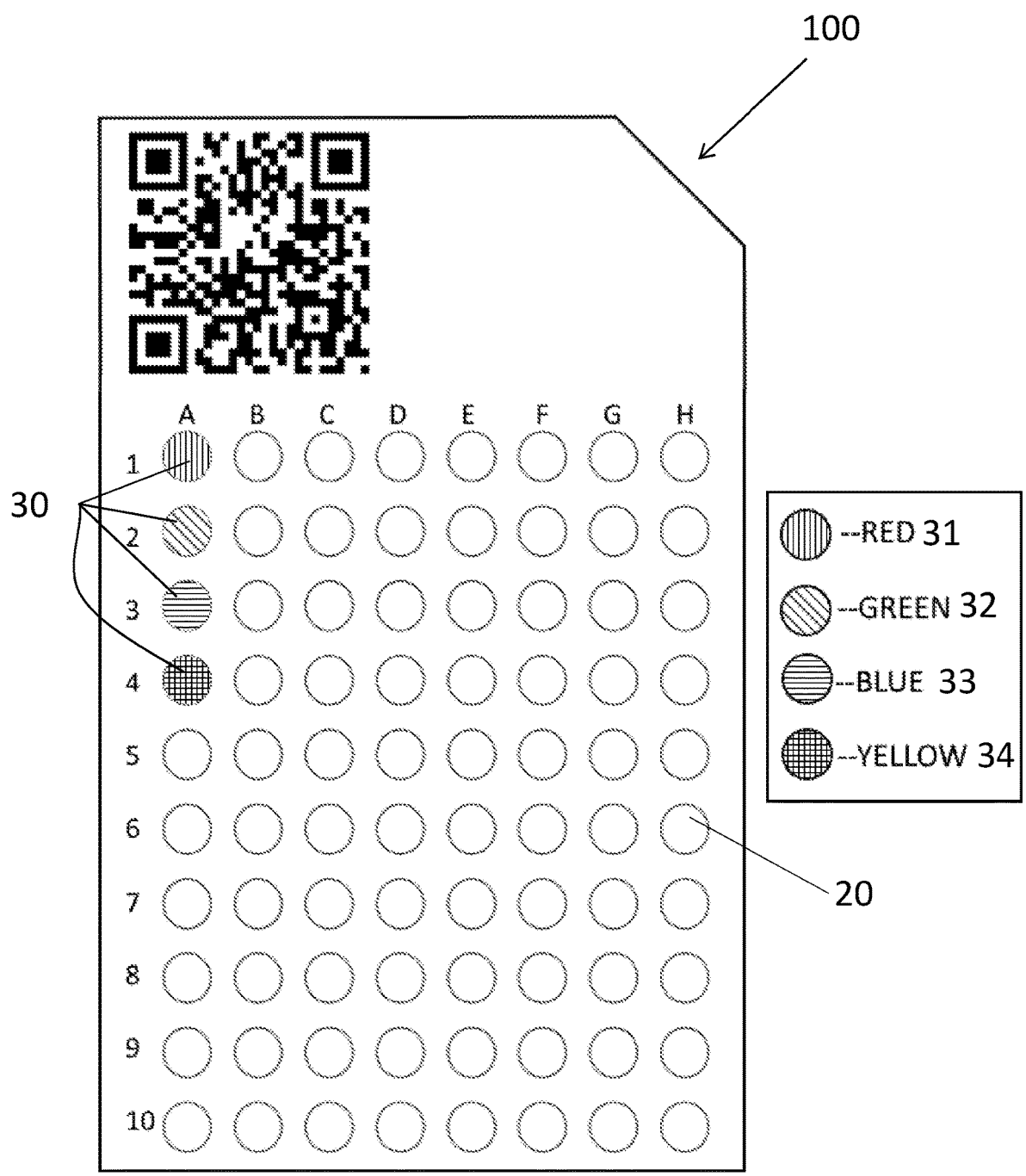
FIG. 1 is a plan view of the answer tablet, according to an embodiment of the present invention.

Preferred embodiments of the present invention and their advantages may be understood by referring to FIGS. 1-5, wherein like reference numerals refer to like elements.

In reference to FIG. 1, a top plan view of an answer tablet 100 is shown according to an embodiment of the present invention. In an example, the answer tablet is provided with a plurality of holes 20 arranged in a grid. Each hole represents a question of a multiple choice test given to a test taker. Each hole will have a corresponding answer bead 30 that can be placed into and removed from a hole 20 by the test taker.

In an example, the beads will fit into the holes of the answer tablet with an interference fit, such that the beads will not easily fall from the holes. In another example, the beads will fit into the holes of the answer tablet with a clearance fit, allowing the beads to be easily removed from the holes.

In an example, shown in FIG. 1. Each answer bead is provided as a translucent colored bead. In the example shown, the bead colors may include red beads 31, green beads 32, blue beads 33 and yellow beads 34. In an example, each bead corresponds to an answer on a multiple choice exam. Further colors may be included such as orange, white, purple, etc., and an answer hole 20 without an answer bead 30 placed inside can represent an answer choice.

In an example, depicted by FIG. 1, each question may be labeled with the corresponding row and column of the answer tablet 100. In another example, each hole may be labeled with a corresponding number which simply begins from 1 and ascends up to the last hole of the tablet. For example, if said labeling was applied to FIG. 1, each hole would be labeled with a number, 1-80, with 1 at the top left and 80 at the bottom right.

The exam may be written such that each answer is provided with a corresponding color. An example question may look as follows:

Question A1: What is the largest rodent in the world?

| RED | Brown Rat |
| GREEN | Capybara |
| BLUE | Raccoon |
| YELLOW | Mole |
| NONE | Jack Rabbit |

In said example, a true/false question question may be provided such that the selection of true is represented by one color, and the selection of false is represented by a second, different color. An example true/false question may look as follows:

Question A3: Adult elephants can't jump.

| RED | True |
| GREEN | False |

In an example, the answer tablet 100 is provided with a Quick Response Code (QR) code 50. The QR code provided to identify the test taker which has submitted the answer tablet being graded. The QR code may also contain information to identify which exam was taken, which course the exam was taken in, and which term the exam was taken.

Figure 2:
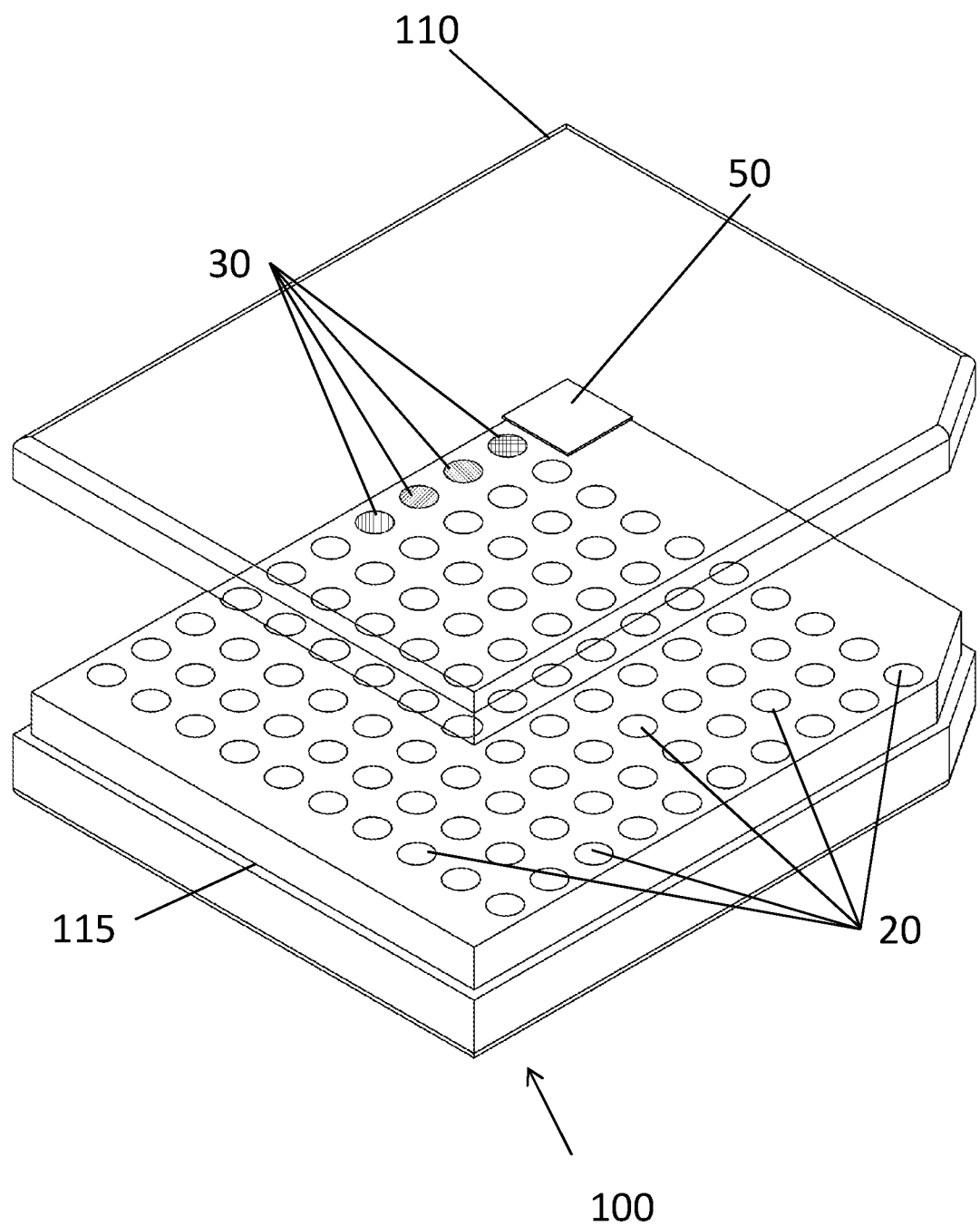
FIG. 2 is a perspective view of the answer tablet, according to an embodiment of the present invention.

With reference to FIG. 2, a perspective view of an example answer tablet 100 is depicted. In the example, the answer tablet is substantially a cuboid. In an example, the answer tablet is further provided with a plurality of holes 20 arranged in a grid. Each hole represents a question of a multiple choice test given to a test taker. Each hole will have a corresponding answer bead 30 that can be placed into and removed from a hole 20 by the test taker.

In an example, answer tablet 100 will be further provided with a lid 110 to prevent beads 30 from falling out of the holes 20 while the answer tablet is being transported or graded. A ledge 115 is provided on the answer tablet to receive the lid 110. The lid should fit onto the ledge with an interference fit such that the lid does not fall of during grading or transportation. The answer tablet may also be provided with one or more beveled corners to aid with proper orientation and insertion into the light enclosure.

In an embodiment having an emphasis on cost-efficiency and/or conservation, a 96 well cell culture tray may be used an answer tablet. In the embodiment, 6 millimeter (mm) diameter translucent, colored beads will be used as the answer beads. The beads may be made from biodegradable materials. In an example airsoft beads may be used. Airsoft beads are typically 6 mm in diameter, come in a variety of translucent colors, and are suitable for the application.

In an embodiment, the answer tablet is provided with a tool for removing a single bead from a hole to allow the test taker to change an answer. In an embodiment, the tool is a tube or straw which creates an interference fit with the answer bead. In another embodiment, the tool is a stylus or pen like object with a small suction cup provided on at least one end. The suction cup is provided to fit on the surface of an answer bead.

Figure 3:
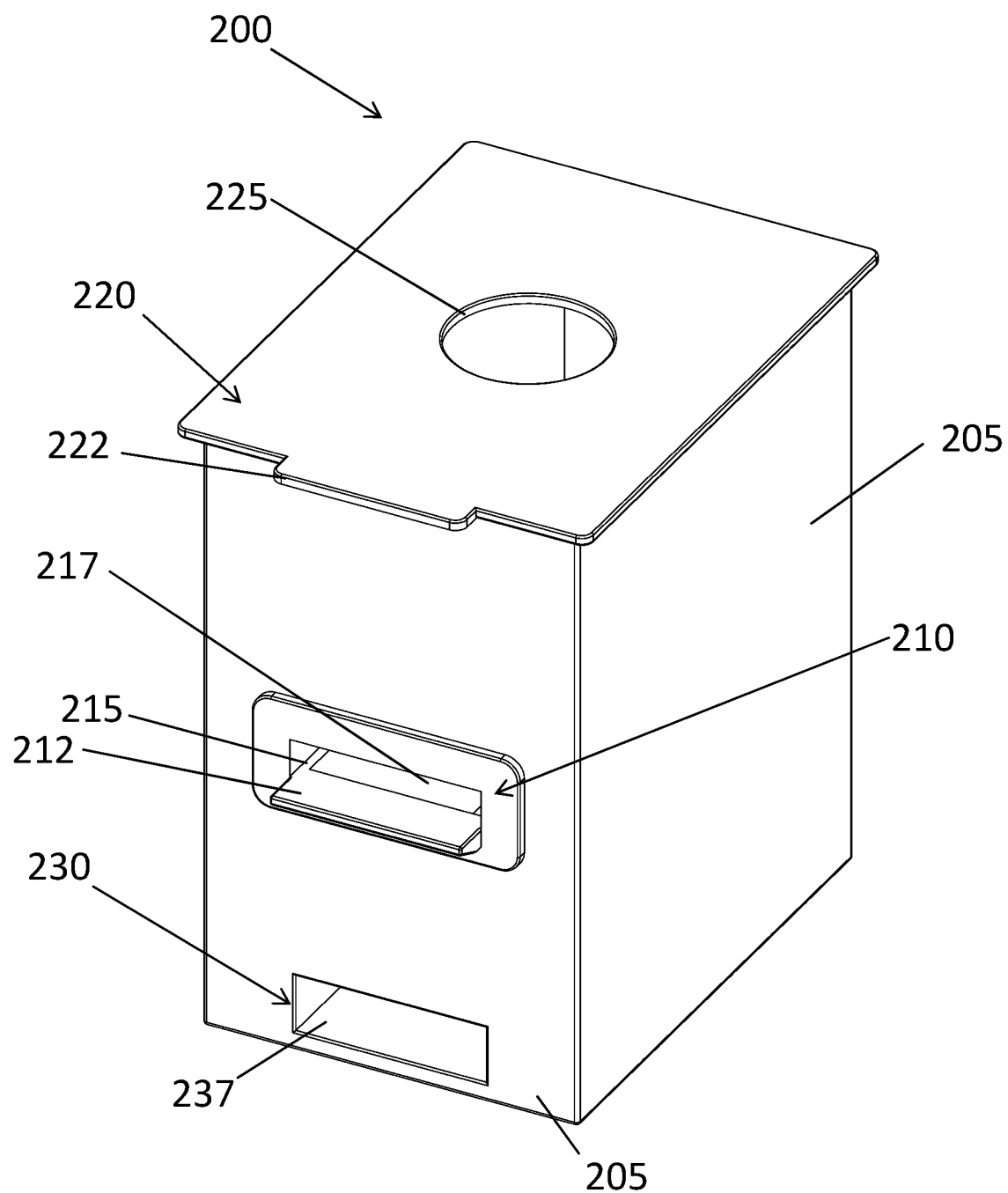
FIG. 3 is a perspective view of the enclosure including a light source, according to an embodiment of the present invention.
Figure 4:
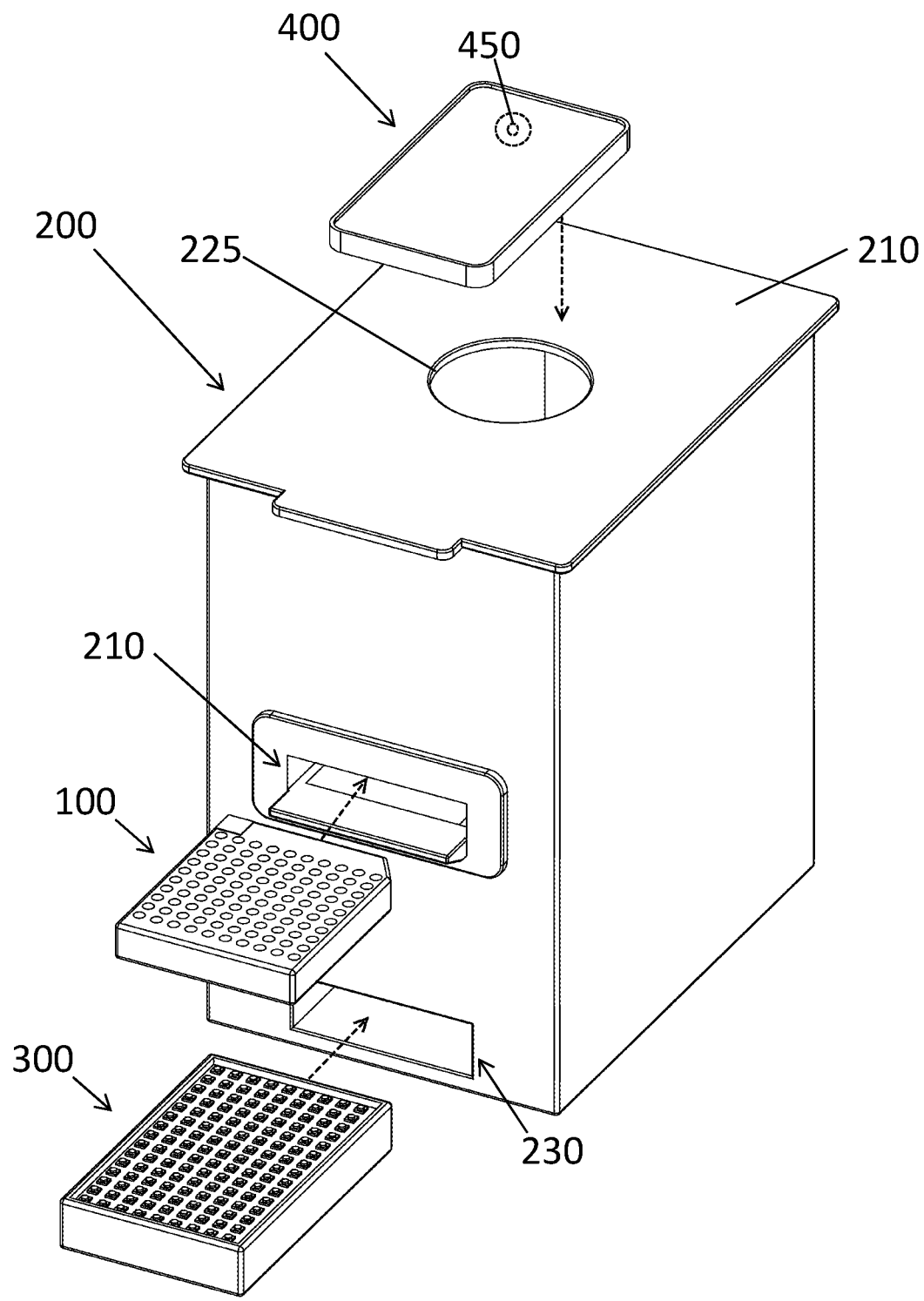
FIG. 4 is an exploded perspective view of the light enclosure, according to an embodiment of the present invention.

In reference to FIG. 3, a light enclosure 200 is depicted in an embodiment of the present invention. The light enclosure is provided with four side walls 250, which are preferably opaque. The light enclosure is further provided with a light dock 230 located below a tablet dock 210. The light dock is provided to house a light source and the tablet dock is provided to house an answer tablet (as shown in FIG. 4). The light dock and the tablet dock may include a lip 212 to aid insertion of the light source and answer tablet.

In an embodiment, the light enclosure will be constructed from inexpensive materials, having a price point much lower than other analytical methods known in the art. Inexpensive materials such as cardboard for the enclosure.

A lid 220 is provided at the top of the light enclosure 200 with opening 225 to allow the camera of a device to capture of image of an inserted answer tablet housed within the tablet dock. In an example, the lid includes a lip 222 to provide further support for a device to be placed onto the lid. The lid may be comprised of a transparent, translucent, or opaque material. In an example, the lid is removable from the rest of the light enclosure.

In an example, the tablet dock 210 includes tablet supports 215 to support an answer tablet placed within the tablet dock. A transparent or translucent tablet surface 217 can be provided between the tablet supports. In an example the tablet surface of the tablet dock may be clear glass, plastic, or another suitable material. In another example, no surface is provided between the tablet supports.

In another example, the light dock may include surface provided as a bottom support 237 for a light source to be housed. In another example, the light source may rest on the bottom side of the light enclosure 200. In an example, the light enclosure 200 is substantially cuboid in shape. The light enclosure may have six sides or be bottomless, with only 5 sides. In said example, the light source may rest on the same surface which the light enclosure is placed upon. In an example, the light source is integrated into the enclosure.

In an additional embodiment, the enclosure may be constructed from a variety of materials known in the art and is preferably opaque.

In an embodiment, the shape of the enclosure may be modified to any shape known in the art. A plurality of enclosure shapes and constructions may be useful in the scoring accuracy of the system as well as aesthetic appeal of the device.

In reference to FIG. 4, an example of the test scanning and evaluation system is depicted. The depiction of the system includes an answer tablet 100 and a light source 300 to be inserted into a light enclosure 200. The tablet dock 210 is positioned above the light dock 230, such that light emitted from the inserted light source transmits through the hollow interior of the light enclosure to illuminate the inserted answer tablet to be scanned.

In an example, a device 400 having a camera 450 is placed onto the lid 210 of the light enclosure 200. The camera of the device is positioned within opening 225 and directed into the hollow interior of the enclosure towards the answer dock. The configuration of the enclosure allows the camera of the device to capture consistently clear images of an inserted answer tablet.

In an example, light source 300 proper backlighting when powered on and inserted into the light dock. The backlighting of the light source provides clarity to distinguish colors of answer beads contained within a tablet 100 being captured by a device camera 450. In an example, light source 300 is comprised of a plurality of light emitting diodes (LEDs) having a color temperature of 4000 to 5000 Kelvin (K). This temperature range is considered 'pure white' light and will provide the least amount of frequency shift within the spectrum of visible light, allowing a camera to better capture accurate color of the inserted answer beads.

In an embodiment, the light source 300 is powered by a rechargeable battery source. In a further embodiment, the light source uses a solar panel, which may be integrated with the body of the light source, to recharge batteries.

In an example, the device 400 to be used in the system may be a smart phone or electronic tablet having a digital camera 450 capable of capturing color photos. The device further comprises an onboard storage medium and processing unit, such that images captured by the camera can be stored and processed by the device.

While a device such as a smart phone or electronic tablet is considered suitable for use with the system, any device with a camera 450 capable of taking a color photo and able to be properly positioned on the lid 210 of the enclosure 200 may also be implemented. The device may store captured images on a storage medium within the device or be connected to a separate storage medium. The device may process stored images with an onboard processor, or the images may be sent and processed with a separate computing device having a processor.

In an example, the device 400 used in the system contains software used to scan and process the images of the answer tablet 100 captured by the camera 450. In the example, a first tablet is provided with the correct answer beads inserted. A QR code 50 may be provided to identify the tablet as the answer key. The camera captures the image of the answer key, processes the color and location of each answer bead and stores the information. After the image of the answer key tablet is captured, processed and stored, a test taker's answer tablet is inserted into the enclosure to be graded. The camera captures an image the test taker's answer tablet to be graded, and said image is processed such that the location and colors of the answer beads within tablet are compared to the image of the answer key tablet. The test taker's answer tablet is scored based on the comparison and the results are recorded. The next test taker's answer tablet is inserted into the enclosure and the process is repeated until all answer tablets are graded.

In an embodiment, the light enclosure 200 and light source 300 are integrated into a software application. The mobile application has the ability to turn the device to an ON function. The application may have the ability to modulate light intensity of the light source 300. In an embodiment, with the software application running, an image of the answer tablet 100 will automatically be captured upon detection of a QR code by camera 450.

In reference to FIG. 5, a method used by the software to evaluate answers is described in an embodiment of the present invention. Upon completion of the test and the desired answer beads input into the tablet by the test-taker, the answer tablet in placed on the light enclosure. The light source is turned to an ON function to emit light through the answer tablet and answer beads.

In an example, the algorithm used by the software, which has been previously downloaded to a user's phone, will view an image of the answer tablet through the lens of a corresponding smart device camera. In step 510, the image is captured as a bitmap. In step 515, the bitmapped image is straightened. In step 520, pixels whose color value falls within a designated color range will be converted to the closest matching answer color. Pixels not falling within any colored range will be considered white or clear and correspond to an unmarked answer. In step 525, colored pixels are clustered to form holes or circles, in correspondence with answer holes on the answer tablet. In step 530, locations of the colored holes are mapped to form a color grid.

In step 535, the answers are evaluated. In the event the scanned image is the answer key, the key is stored in the primary memory of the computer, comprising optional step 550.

In step 555, the test-takers form is matched with the answer key, requiring steps 525 through 535. Step 525 uses a threshold value to determine which pixels correspond to a predetermined answer color. In an embodiment, the threshold values are then adjusted—increased or decreased—during each iteration of the loop. In step 565, the test "score" is displayed on the screen of the smart device.

In an embodiment, the number of light pixels required to form an answer hole may be increased or decreased depending on the design of the test answer tablet. Increasing or decreasing this threshold allows for an optimal score to be achieved in response to a more accurate scan occurring.

In an embodiment, the software application is integrated to a grade reporting platform, in which the administrator of the exam is able to record and submit grades to test-takers. Furthermore, the software application will have the ability to control the light source and light enclosure, switching the system to an ON function. As mentioned, it may be useful to modulate the light intensity emitted by the light source.

While a system could be imagined without the use of a light enclosure, the use of the enclosure provides many benefits. In an example, when device 400 is placed onto lid 210 of the light enclosure 200, device will be oriented on a plane parallel to the plane which the answer tablet 200 rests when provided in the answer dock 220. The configuration prevents any distortion due to capturing an image of the answer tablet at an angle and allows for more accurate scoring. In a further example, because the distance between the lid of the enclosure and the tablet dock is a set distance, a software application of a device 400 with a camera 450 may be configured to set the focal distance accordingly. In an example, the distance between the lid and the tablet dock is 5 inches. This will enable consistently clear captured images of the answer tablets and allow for a reduction in computer processing unit (CPU) usage for the device.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An answer evaluation system comprising:
   a. an enclosure having a hollow interior defined by one or more sidewalls, a tablet dock formed by a first aperture on one of the one or more sidewalls and a tablet support, a light dock located below the tablet dock and formed by a second aperture provided on one of the one or more sidewalls, a top having a camera aperture;
   b. an answer tablet having a plurality of holes oriented to form an answer grid, the answer tablet to be received by the tablet dock provided in the enclosure;
   c. a plurality translucent colored beads for removably engaging the plurality of holes of the answer tablet; and
   d. a light source to be received by the light dock within the interior of the enclosure.

2. The system of claim 1, wherein the answer tablet is a clear 96 well cell culture tray.

3. The system of claim 2, wherein plurality of translucent colored beads are 6 millimeter diameter plastic beads.

4. The system of claim 3 wherein the answer tablet further includes a lid.

5. The system of claim 1, further comprising a device having a camera, wherein the camera of the device is placed onto the top of the enclosure within a perimeter of the camera aperture.

6. The system of claim 5, wherein a top surface of the top of the enclosure lies forms a first plane, and wherein a top surface of the tablet support lies forms a second plane, wherein the first plane and the second plane are parallel.

7. The system of claim 1, wherein the one or more sidewalls of the enclosure are opaque.

8. The system of claim 7, wherein the top of the enclosure is translucent.

9. The system of claim 1, wherein the answer tablet further comprises a QR code.

10. The system of claim 1, wherein the light source is comprised of a plurality of light emitting diodes.

11. The system of claim 10, wherein the light source emits pure white light having a color temperature range of approximately 4000 to 5000 Kelvin.

* * * * *